United States Patent Office 3,433,559
Patented Mar. 18, 1969

3,433,559
VARIABLE FOCAL LENGTH OPTICAL SYSTEM
Karl Vockenhuber, Potzleinsdorferstrasse 118, Vienna XVIII, Austria, and Karl Bystricky, Wiener Neudorf, Austria; said Bystricky assignor to said Vockenhuber
Filed Feb. 25, 1964, Ser. No. 347,309
Claims priority, application Austria, Mar. 1, 1963,
A 1,626/63
U.S. Cl. 350—42                                                  8 Claims
Int. Cl. G02b 7/04, 7/10, 9/00

ABSTRACT OF THE DISCLOSURE

An optical system for photographic or cinematographic apparatus, which comprises an objective of variable focal length comprising at least two members defining an optical axis. At least one objective member is arranged for movement along the optical axis for varying the focal length. The objective forms a real intermediate image. The position of the latter is variable in dependence on a variation of the focal length of the objective. At least one inverting system is arranged on the optical axis in series with the objective forming a real image of the intermediate image. At least one member of the inverting system is arranged for continuous movement along the optical axis for continuously varying the magnification factor of the inverting system. The movable member of the inverting system is displaced along the optical axis simultaneously with the movable member of the objective in such manner, that the plane of the image formed by the inverting system is invariable, when varying the focal length of the total system. An aperture diaphragm is provided between the movable member of the inverting system and the locus of the image formed by the inverting system. An image of the aperture diaphragm is being formed within the objective, and the inverting system forming the image of the diaphragm on the optical axis so that the movable member will move through the image of the diaphragm.

---

The present invention relates to an optical system in general, and to an optical system for photographic or cinematographic apparatus, which system comprises an objective, the aperture diaphragm plane of which is not accessible or is accessible with difficulty for the incorporation and/or adjustment of a diaphragm, in particular.

In the design of photographic or cinematographic objectives difficulties are often involved because due to structural reasons the aperture diaphragm cannot be arranged in the position which would be most desirable for the design of the objective. This problem occurs mainly with objectives having a variable focal length. These objectives have a supplementary objective which has a variable magnification and which includes a plurality of members which are displaceable along the optical axis. Objectives having a variable focal length further include a main objective, which has a fixed focal length and transforms the image formed by the supplementary objective into an image on the film. To minimize the dimensions of the objective and to utilize the various objective members in a suitable manner for correction, it would be desirable to arrange the aperture diaphragm adjacent to the displaceable objective members. This is difficult, however, because with a constant diaphragm diameter the relative aperture will be changed by a variation of the focal length. For this reason, it is necessary in such objectives to adjust the diaphragm in dependence on the focal length. Hence, the diaphragm cannot be coupled to an exposure meter or cannot be automatically adjusted in dependence on the illumination of the object to be photographed.

In order to avoid these difficulties, virtually all previously disclosed objectives having a variable focal length, have the aperture diaphragm disposed in or in front of the main objective, behind the displaceable objective members. As a result, the diameters of the forward members of objectives having a variable focal length are not determined by beams which are parallel to the axis but by inclined beams and become extremely large. In addition to these large dimensions, it is also disturbing that a variation of the focal length results in a change of the zones in which the various members are utilized. As a result, the expenditure required for correction in such systems is very high.

In cameras comprising objectives having a fixed focal length and detachably mounted on the camera housing, difficulties were also involved when it was desired to couple the aperture diaphragm of the objective to an exposure meter incorporated in the camera or to provide for an automatic adjustment of the diaphragm by such exposure meter. In the first case, a disengageable coupling for connection to the diaphragm setting member was required. A satisfactory solution for the second case has not yet been provided.

In reflex cameras provided with interchangeable objectives, the dividing mirror for the viewfinder had to be disposed behind the objective so that the viewfinder image was darkened when the diaphragm opening was reduced.

In the previously usual devices it was also undesirable that in a set of interchangeable objectives arranged, e.g. in an objective turret, each of these objectives had to be provided with a separate diaphragm and a separate focusing device, so that the cost of such objectives was relatively high.

It is an object of the invention to minimize and to simplify the above mentioned optical systems and to avoid the disadvantages of the same.

It is a further object of the invention to provide new optical systems having a variable focal length with an extreme range of focal length maintaining the size and the corrective expenditure within reasonable limits.

It is still a further object of the invention to provide new optical systems of variable focal length having in the minimum focal length setting an extreme wide angular field.

With these and other objects in view, which will become apparent in the following detailed description, the present invention will be clearly understood in connection with the accompanying drawings, in which.

To enable a comparison of the subject matter of the invention with the previously usual objective designs, the consideration is based on an existing objective having a variable focal length. This objective is of the Vario-Glaukar type and comprises a positive front member 1, a positive main objective 2 and a negative member, which is displaceably arranged between the members 1 and 2. The positive front member 1 performs a compensating movement to keep the locus of the image constant. In the drawing, the objective members are represented by thin lenses. The objective is shown in a wide-angle position in FIG. 1, in a telephoto position in FIG. 3 and in an intermediate position in FIG. 2. The main rays 4 directed to the corner of the image area and the aperture rays 5, which are parallel to the axis and will be obtained if the aperture diaphragm of the exiting objective is disposed at $Bl_I$, are shown in the drawing for the three settings. The image plane in which the image is formed on the film, is indicated at $B_1$. An increase in focal length will result in a rearward displacement of the entrance pupil $EP_I$. In the telephoto position, the distance of the entrance pupil from the front member is about twice the overall length of the objective. It is apparent from the drawing that the front member must be extremely large in diameter and that its size is determined by the pencil of rays accompanying the main ray shown rather than by the aperture ray.

Figures 1, 2:
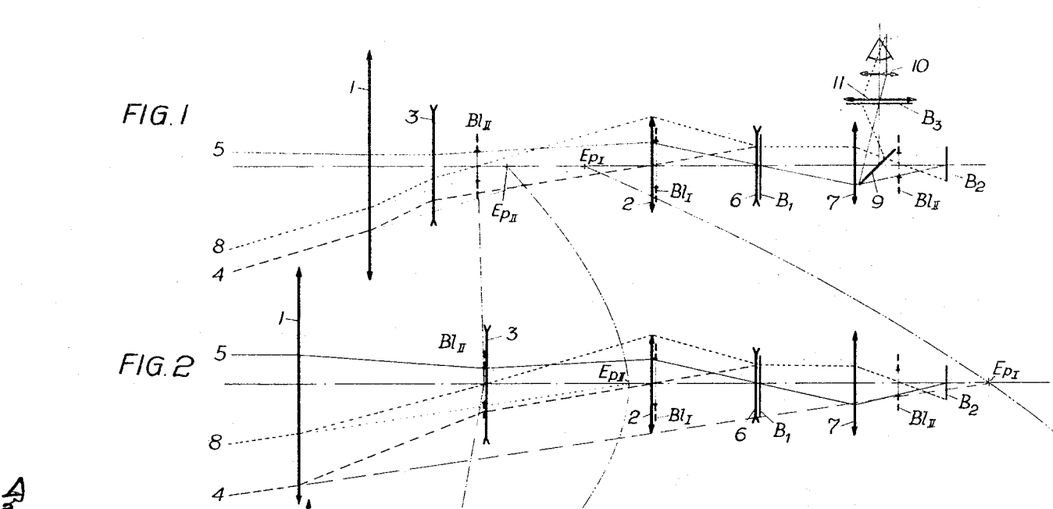
FIGS. 1 to 3 show diagrammatically an optical system having a variable focal length of a camera in three different focal length settings, the members of the system being represented by thin lenses.
Figure 3:
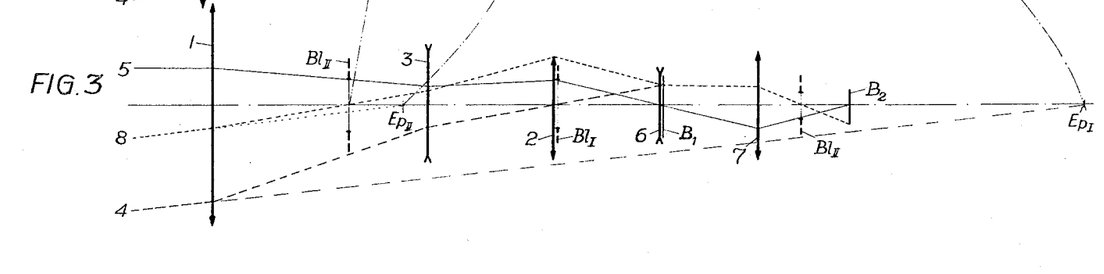

According to the invention it is proposed to transform the image formed by the objective in the first image plane $B_1$ by an inverting system 7 into an image in the second image plane $B_2$ and to arrange in the inverting system an aperture diaphragm $Bl_{II}$, an image of which is formed in the objective having a variable focal length. The locus of the diaphragm $Bl_{II}$ and/or of its real image $\overline{Bl}_{II}$ may be varied within relatively wide limits in dependence on the refractive power of a negative field lens disposed in the first image plane.

The diaphragm image $\overline{Bl}_{II}$ is disposed adjacent to the displaceable negative member 3 and will not be changed in locus and size as long as it is disposed behind the displaceable negative member. After the negative member 3 has moved through the locus of the diaphragm image a further increase in focal length will cause the real image of the diaphragm to move toward the front member 1. At the same time, the diameter of the diaphragm image is increased. As has already been explained, it would not be possible with a reasonable expenditure to provide a structural diaphragm at the locus of the diaphragm image $\overline{Bl}_{II}$.

The novel optical system has the same relative aperture as the objective having a variable focal length described hereinbefore so that the aperture ray 5 is the same in both cases. On the other hand, the main ray 8 directed to the corner of the image area enters the objective members 1 and 3 at a much smaller distance from the optical axis so that these two members may be linearly reduced in size to less than one half compared to the size of the original structure and a saving of more than seven eighths of the volume and weight of the original design is possible.

The entrance pupil is relatively closely spaced behind the front member and performs a reciprocating movement during the change of the focal length. The largest distance of the entrance pupil from the front lens will be obtained when the system is approximately in the position shown in FIG. 2.

If an image of the object is formed twice, the intermediate image formed in the image plane $B_1$ may have image defects, which are compensated by the inverting system 7. Hence, the main objective 2 may be greatly simplified in comparison with the original design and may consist, e.g. of an achromatic lens. It will be understood, however, that the main objective can compensate only defects which are independent of the focal length setting. Because in the image-forming optical system according to the invention the objective members 1 and 3 are utilized for correction in a much more favorable manner, they may have higher refractive powers and may be simpler in structure so that the overall length of the objective may be reduced—this will result in a further reduction of the diameters of the lens members—and/or the focal length range of the system having a variable focal length can be increased. In the present example, an optimum utilization of the objective on the lines indicated above has not been adopted in order to enable a clearer representation of the direct influence of the formation of an image of the aperture diaphragm in the objective on the utilization of the objective.

A semitransparent mirror is arranged between the reversing system 7 and the diaphragm $Bl_{II}$ and deflects a part of the light into a viewfinder system. For the sake of clarity, this viewfinder is shown only in FIG. 1. Without any further intermediate optical means, a real image of the object to be photographed is formed in the image plane $B_3$. This image is true to side, and can be viewed through the eyepiece 10. It will be understood that the path of rays in the viewfinder can be aligned parallel to the optical axis by the use of a second mirror, so that an image results which is true to side and erect.

While the above described optical systems may be constructed—regarding their optical data as range of the focal length and focal length respectively, and relative aperture—in the previously usual manner, this is not or only in a restricted manner possible for the systems described in the following It has appeared that with objectives of variable focal length having a range of focal length of 10:1 and more, and a minimum focal length smaller than 6 (relative to the 8 mm. size) especially the front members reach intolerable dimensions. By this invention a way is given to maintain the size and the corrective expenditure, also in optical systems having these extreme optical performances, within reasonable limits. This is achieved mainly by the fact that the real image of the aperture diaphragm may take its optimum position independently of the mechanical conditions. Furthermore it is essential that the front member remains stationary when the focal length is changed, so that a front plate for the objective is not necessary.

In the following an optical system for 8 mm. film cameras will be described (FIGS. 4 to 6), the optical system having a range of the focal length of 4 to 40 mm. with a relative aperture of 1:1.8.

Figure 4:
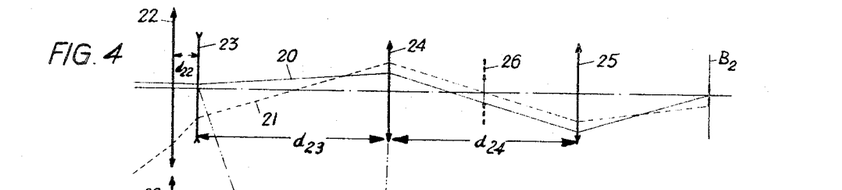
FIGS. 4 to 6 represent an optical system for 8 mm. film cameras having a range of focal length of 4 to 40 mm. in three different settings, the individual members of the system being represented by thin lenses.
Figure 5:
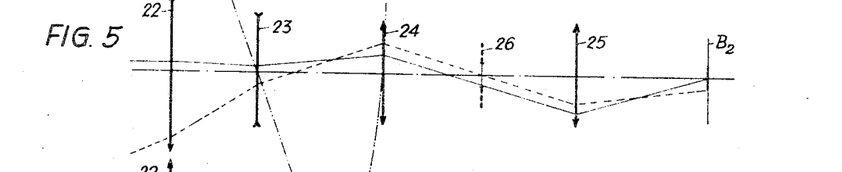
Figure 6:
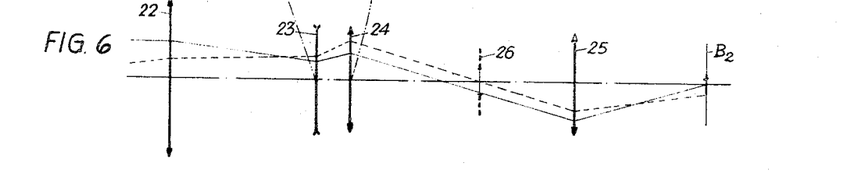

The individual members of the optical system are represented by thin lenses, the aperture rays 20, which are parallel to the axis are shown in full lines, the main rays 21 directed to the corner of the image area are represented in broken lines. (In order to avoid a vignetting the image diagonal has been increased of 10% in comparison with the image size.)

The new optical system has a positive front member 22, which is stationary, and is followed by an axially displaceable negative member 23. The movement of the negative member 23 is determining mainly for the variation of the focal length of the total system, whereas the adjustment of the positive member 24 which is disposed at the third place substantially serves for the maintaining of the image in a constant position. The intermediate image formed by the positive member 24 is transformed into a real image on the image plane $B_2$ by the inverting system 25.

This image is upright and true to side. The aperture diaphragm 26 is provided between the member 24 and the inverting system 25. In this case a field lens is not necessary.

The new system is characterized by the following data indicating the individual focal lengths and spacings.

| Member of the optical system | Ref. number | Focal length in mm. | Spacings (mm.) | | | | | | | |
|---|---|---|---|---|---|---|---|---|---|---|
| | | | | Fig. 4 | | Fig. 5 | | Fig. 6 | | |
| $L_I$ | 22 | +87.5 | $d_{22}$ | 7.50 | 16.94 | 26.38 | 35.82 | 45.25 | | |
| $L_{II}$ | 23 | −13.0 | $d_{23}$ | 58.68 | 48.57 | 38.11 | 26.89 | 10.00 | | |
| $L_{III}$ | 24 | +14.4 | $d_{24}$ | 57.85 | 58.82 | 59.53 | 61.32 | 68.78 | | |
| $L_n$ | 25 | +20.0 | | | | | | | | |
| Back focus | | | | 40.00 | 40.00 | 40.00 | 40.00 | 40.00 | | |
| Total focal length | | | | 4.08 | 5.67 | 8.45 | 14.16 | 38.89 | | |

Distance of the diaphragm to the inverting system: 28.52 mm.

In spite of the extreme large range of the focal length and the great object angle the diameter of the front lens has approximately 40 mm. and thus remains within reasonable limits.

The new optical system has also advantages concerning the control of the individual objective members. Contrary to most of the known systems having a variable focal length and a mechanical compensation the member 24 determining the maintaining of the image in a constant position is moved in a constant direction and does not perform a reciprocating movement.

Figure 7:
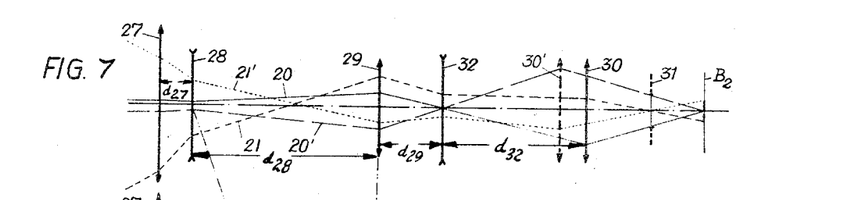
FIGS. 7 to 9 show a system having a variable focal length in three different positions, the inverting system of this system being utilized in two different magnification settings.
Figures 8, 9:
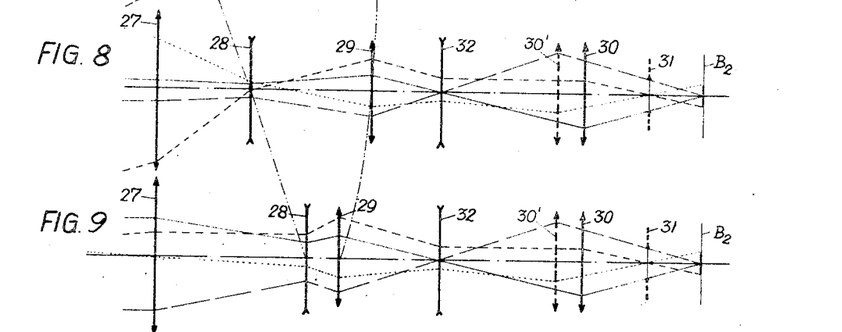

FIGS. 7 to 9 show a system for 8 mm. cameras having a variable focal length and a maximum relative aperture of 1:1.8. The objective of this system is constructed analogously to that of the embodiment shown in the FIGS. 4 to 6. The system has a positive front member 27 which is stationary, a negative a negative member 28 which is displaceable and a positive member 29 which is displaceable for the maintaining of the image in a constant position. The inverting system 30 has a magnification which differs from unity. It may be used in two different settings. In a first setting of the inverting system 30 (shown in full lines) the magnification of the same is $\beta=0.816$. In this position of the inverting system, the total system has a range of the focal length of 4 to 40 mm. In the second setting ($\beta=1.224$, represented in the drawing in broken lines) a variation of the focal length is possible in the range of 6 to 60 mm. The aperture diaphragm 31 is disposed between the inverting system and the image plane in order to maintain the size of the diaphragm image independent of the position of the inverting system and to maintain the transmitting power of the objective in a constant level when the inverting system is displaced. A negative field lens 32 is provided in the plane of the intermediate image. The refractive power of this field lens is designed in a manner that the image formed of the aperture diaphragm 31 appears in the objective in an optimum position.

For the first setting ($\beta=0.816$) a main ray is indicated by 20, and an aperture ray is indicated by 21. In the second mentioned setting ($\beta=1.224$) the corresponding rays have the reference numbers 20′ and 21′.

The above mentioned system having a variable focal length is characterized by the following data indicating the individual focal lengths and spacings.

A. MAGNIFICATION OF THE INVERTING SYSTEM 30 $\beta=0.816$

| Member of the optical system | Ref. number | Focal length in mm. | Spacings | | | | | | | |
|---|---|---|---|---|---|---|---|---|---|---|
| | | | | Fig. 7 | | Fig. 8 | | Fig. 9 | | |
| $L_I$ | 27 | +80.00 | $d_{27}$ | 10.00 | 18.94 | 27.87 | 36.81 | 45.74 | | |
| $L_{II}$ | 28 | −13.00 | $d_{28}$ | 57.06 | 47.33 | 37.22 | 26.26 | 10.00 | | |
| $L_{III}$ | 29 | +15.48 | $d_{29}$ | 19.64 | 20.43 | 21.61 | 23.63 | 30.95 | | |
| $L_F$ | 32 | −16.10 | $d_{32}$ | 44.49 | 44.49 | 44.49 | 44.49 | 44.49 | | |
| $L_n$ | 30 | +20.00 | | | | | | | | |
| Back focus | | | | 36.33 | 36.33 | 36.33 | 36.33 | 36.33 | | |
| Total focal length | | | | 4.00 | 5.65 | 8.60 | 14.81 | 39.94 | | |

B. MAGNIFICATION OF THE INVERTING SYSTEM 30′ $\beta=1.224$

| Member of the optical system | Ref. number | Focal length in mm. | Spacings | | | | | | | |
|---|---|---|---|---|---|---|---|---|---|---|
| | | | | Fig. 7 | | Fig. 8 | | Fig. 9 | | |
| $L_I$ | 27 | +80.00 | $d_{27}$ | 10.00 | 18.94 | 27.87 | 36.81 | 45.74 | | |
| $L_{II}$ | 28 | −13.00 | $d_{28}$ | 57.06 | 47.33 | 37.22 | 26.26 | 10.00 | | |
| $L_{III}$ | 29 | +15.48 | $d_{29}$ | 19.64 | 20.43 | 21.61 | 23.63 | 30.95 | | |
| $L_F$ | 32 | −16.10 | $d_{32}$ | 36.33 | 36.33 | 36.33 | 36.33 | 36.33 | | |
| $L_n$ | 30′ | +20.00 | | | | | | | | |
| Back focus | | | | 44.49 | 44.49 | 44.49 | 44.49 | 44.49 | | |
| Total focal length | | | | 6.01 | 8.48 | 12.90 | 22.22 | 59.92 | | |

The free diameter of the front member is 47 mm.

The embodiments described in the following differ from those described hereinbefore above all by the fact that the inverting system is moved in an axial direction during a variation of the focal length of the total system. Hence, the inverting system continually changes its own magnification $\beta$. The objective has also one single displaceable member only, so that the intermediate image changes, contrary to the previously described embodiments its position during an adjustment of the total focal length. The laws of motion of the displaceable member of the objective and of the inverting system are balanced to each other in such a manner that the locus of the image remains constant during a variation of the focal length. Whilst in the embodiments described hereinbefore having a fixed inverting system only residual image defects which are independent of the focal length may be compensated, it is possible in the systems described in the following to compensate image defects which are dependent on the focal length by the inverting system.

Figure 10:
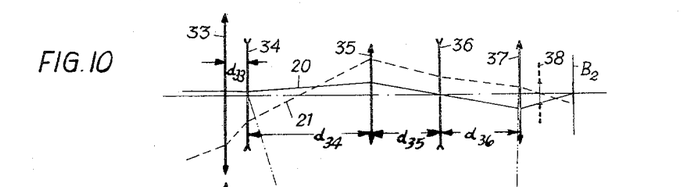
FIGS. 10 to 21 represent four different systems having a variable focal length, each of them shown in three different focal length settings.
Figure 11:
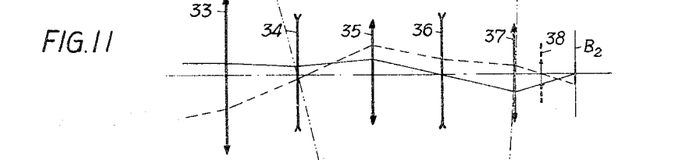
Figure 12:
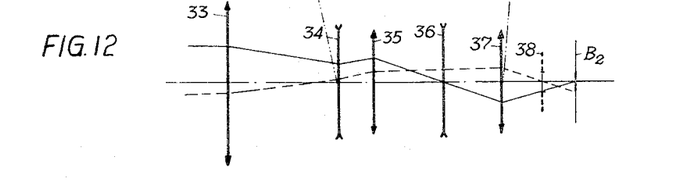

The optical system for 8 mm. cameras shown in FIGS. 10 to 12 has a positive front member 33 which is stationary and followed by a negative member 34 which is displaceable. The positive member 35 situated at the third place is stationary as well as the negative field lens 36. During the variation of the focal length the positive inverting system 37 performs an axial movement in a direction opposed to the movement of the negative member 34. In order to maintain the aperture of the objective independent of the variation of the focal length, the aperture diaphragm 38 is arranged between the image plane $B_2$ and the inverting system 37.

The system having a variable focal length has the following data, indicating the individual focal lengths and spacings:

optical axis of the virtual image formed by this negative member changes its directions. Previously the go- and return movement of the virtual image was taken into consideration by the fact that the member performing the compensating movement also performed a reciprocating movement. A disadvantage of this construction was the relatively difficult control of the objective member and that the variation of the magnification $\beta$ of the objective member acted in a partial range against the variation of the magnification, effected by the other member.

According to the invention the magnification $\beta$ of the inverting system takes the value $\beta=1$ simultaneously as the magnification of the negative member. The movement of the inverting system does not change, however, its direction. Hence the variation of the value $\beta$ of the inverting system assists the variation of the focal length of the system during the total range of the adjustment. A further advantage of the new arrangement resides in, that the variation of the magnification may be divided and effected by the three members 34, 35 and 37, so that, in spite of the large total range the variation of the magnification of the individual members remains relatively small. This is important above all for the correction of these members.

Figures 13, 14:
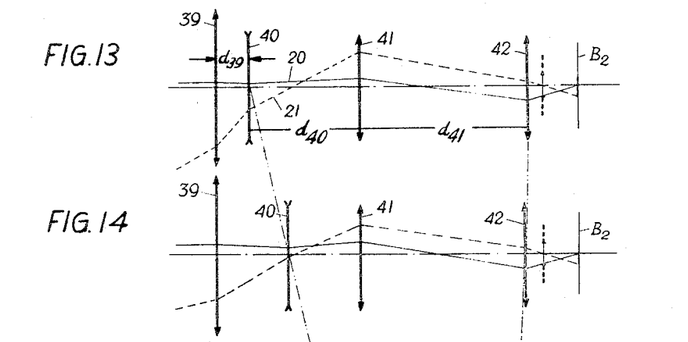
Figure 15:
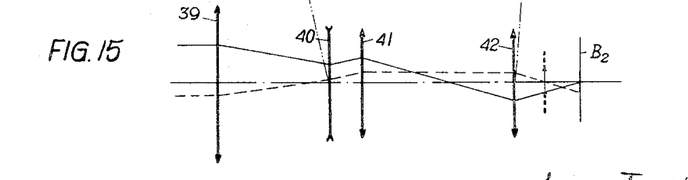

The FIGS. 13 to 15 show another optical system for 8 mm. film cameras having a variable focal length. The system has a range of the focal length of 4 to 40 mm. and a maximum relative aperture of 1:1.8.

The objective of this system has, according to that of the last described embodiment, a positive front member which is stationary, a negative member 40 which is displaceable and a fixed positive member 41. In this embodiment a field lens is not necessary. The inverting system 42 is axially displaceable. The aperture diaphragm is provided between the inverting system and the image

| Member of the optical system | Ref. number | Focal length in mm. | Spacings | | | | |
|---|---|---|---|---|---|---|---|
| | | | | Fig. 10 | Fig. 1 | | Fig. 12 |
| $L_I$ | 33 | +58.50 | $d_{33}$ | 6.67 | 15.00 | 22.00 | 30.50 | 34.13 |
| $L_{II}$ | 34 | −14.00 | $d_{34}$ | 37.47 | 29.13 | 22.13 | 13.63 | 10.00 |
| $L_{III}$ | 35 | +13.91 | $d_{35}$ | 20.90 | 20.90 | 20.90 | 20.90 | 20.90 |
| $L_F$ | 36 | −33.33 | $d_{36}$ | 23.77 | 23.21 | 22.33 | 20.00 | 18.10 |
| $L_n$ | 37 | +10.00 | | | | | | |
| Backfocus | | | | 16.23 | 16.79 | 17.67 | 20.00 | 21.90 |
| Total focal length | | | | 4.09 | 6.98 | 12.29 | 29.37 | 44.70 |

The total range of the focal length is approximately 4 to 45 mm. The maximum relative aperture is 1:1.8, the free diameter of the front lens is 30 mm.

The above described optical system is designed in a plane $B_2$. The laws of motion of the negative member 40 and the inverting system are designed in such a manner, that the locus of the image remains constant, during a variation of the focal length.

| Member of the optical system | Ref. number | Focal length in mm. | Spacings | | | |
|---|---|---|---|---|---|---|
| | | | | Fig. 4 | Fig. 5 | Fig. 6 |
| $L_I$ | 39 | +62.00 | $d_{39}$ | 10.00 | 15.85 | 21.70 | 27.55 | 33.40 |
| $L_{II}$ | 40 | −13.00 | $d_{40}$ | 33.40 | 27.55 | 21.70 | 15.85 | 10.00 |
| $L_{III}$ | 41 | +14.76 | $d_{41}$ | 31.31 | 50.97 | 50.42 | 49.39 | 46.16 |
| $L_n$ | 42 | +10.00 | | | | | | |
| Backfocus | | | | 14.88 | 15.22 | 15.77 | 16.80 | 20.00 |
| Total focal length | | | | 4.14 | 6.07 | 9.64 | 17.17 | 40.00 | manner that the magnification $\beta$ of the negative member is adjusted from a value smaller than unity to a value larger than unity, and thus has the value $\beta=1$ in an intermediate position. As a result the movement along the The front lens of the system has a free diameter of 36 mm.

In order to enable a simple mechanical construction and to ensure small diameters of the front lens it is desirable to adjust for the distance setting a member lying within the system, preferably one which is displaceable for the focal length, rather than the front lens. This requires however, that the member in question has a magnification β which differs from unity. The movement for the distance setting of this member must be dependent on the focal length, but this may be easily achieved by inserting of a suitable driving means.

Figures 16, 17:
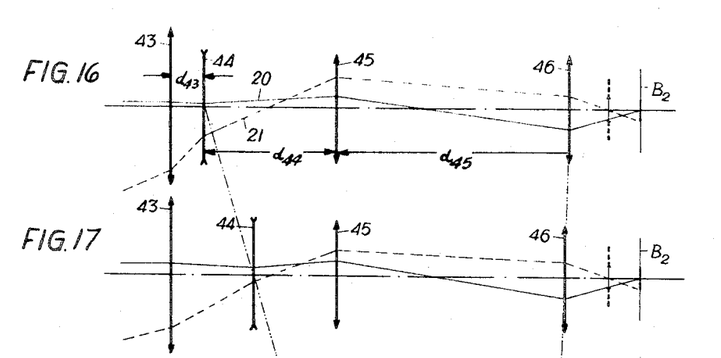
Figure 18:
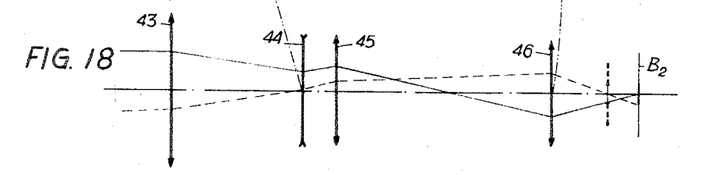

FIGS. 16 to 18 show an optical system for 8 mm. film cameras which is adapted for a distance setting by a displacement of the inverting system. The magnification β of the inverting system remains in all focal length settings smaller than unity and reaches in the telephoto position of the system the highest value β=0.8, so that a movement is possible which is sufficient for a distance setting. It is also possible to provide a fixed focus setting which is dependent on the focal length, instead of a manual distance setting. For this aim the inverting system and the displaceable negative member or the following positive member are moved from the positions as indicated in the following table by fixed values to a closeup setting. The dependence of the focal distance on the focal length may be varied in relatively wide limits by the adjustment of two members.

| Member of the optical system | Ref. number | Focal length in mm. | | Spacings | | | |
|---|---|---|---|---|---|---|---|
| | | | | Fig. 16 | Fig. 17 | | Fig. 18 |
| $L_I$ | 43 | +75.00 | $d_{43}$ | 10.00 | 17.50 | 25.00 | 32.50 | 40.00 |
| $L_{II}$ | 44 | −15.00 | $d_{44}$ | 40.00 | 32.50 | 25.00 | 17.50 | 10.00 |
| $L_{III}$ | 45 | +17.06 | $d_{45}$ | 70.34 | 69.96 | 69.33 | 68.16 | 65.41 |
| $L_n$ | 46 | +14.75 | | | | | | |
| Back focus | | | | 21.62 | 22.00 | 22.63 | 23.80 | 26.55 |
| Total focal length | | | | 4.21 | 6.21 | 9.97 | 18.13 | 40.00 |

The maximum relative aperture is 1:1.8, the free diameter of the front lens is 39 mm.

Figure 19:
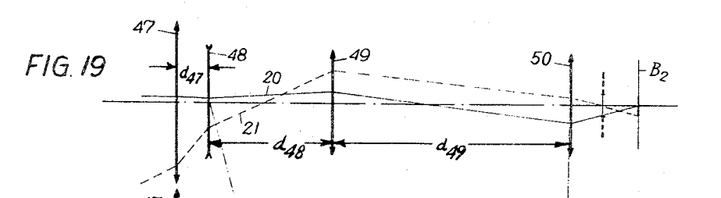
Figure 20:
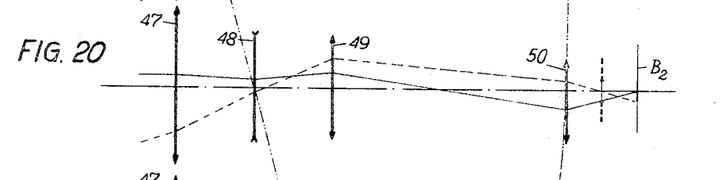
Figure 21:
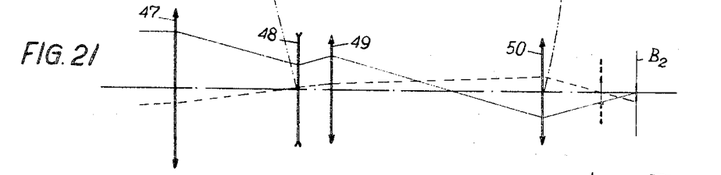

FIGS. 19 to 21 show a system for 8 mm. cameras having a variable focal length and an extremely large range of the focal length of 4 to 60 mm.

The maximum relative aperture is 1:1.8, the diameter of the front lens is 39 mm.

The new system is characterized by the following data:

| Member of the optical system | Ref. number | Focal length in mm. | | Spacings | | | |
|---|---|---|---|---|---|---|---|
| | | | | Fig. 19 | Fig. 20 | | Fig. 21 |
| $L_I$ | 47 | +64.16 | $d_{47}$ | 10.00 | 17.00 | 24.00 | 31.00 | 37.78 |
| $L_{II}$ | 48 | −12.50 | $d_{48}$ | 37.78 | 30.78 | 23.78 | 16.78 | 10.00 |
| $L_{III}$ | 49 | +17.20 | $d_{49}$ | 71.38 | 70.94 | 70.16 | 68.56 | 63.49 |
| $L_n$ | 50 | +14.21 | | | | | | |
| Back focus | | | | 20.54 | 20.98 | 21.75 | 23.36 | 28.43 |
| Total focal length | | | | +4.00 | +6.19 | +10.69 | +21.86 | +60.00 |

Further advantages of the invention are due to the fact that the first intermediate image may be smaller or larger in size. For instance an objective for 8 mm. substandard film may be used to form an intermediate image which corresponds to the 8 mm. film and this image can be transformed by a magnifying inverting system into an image on 16 mm. film. Whereas the relative aperture of the overall system is reduced in this case in inverse proportion to the magnification of the inverting system, the dimensions of the image-forming optical system are nevertheless substantially reduced. The reduction of the dimensions of the lens is mainly significant with objectives having a variable focal length and with special objectives, such as objectives having an extremely wide angle. An objective for 16 mm. cameras may also be used in an analogous way by inserting of a reducing inverting system for the 8 mm. size, which results in an increase of the relative aperture.

The invention is not restricted to the example shown. It may be applied to all types of objectives, particularly to all mechanically or optically compensated objectives having a variable focal length. The inverting system may be a mirror or lens system. The optical system may form a plurality of intermediate images, and the aperture diaphragm as well may be arranged between the locus of the first intermediate image formed by the objective and the image plane of the total system. One or more of the inverting systems may be displaceable for the variation of the focal length of the total system.

It will be understood that the emobdiments for 8 mm. films as described in the following claims may also be converted to other sizes without departing from the scope of the invention.

While we have disclosed several embodiments of the present invention, it is to be understood that these embodiments are given by example only and not in a limiting sense, the scope of the present invention being determined by the objects and the claims.

What we claim is:
1. In an optical system for photographic or cinematographic apparatus.
   an objective of variable focal length comprising at least two members defining an optical axis;
   at least one objective member being arranged for movement along said optical axis for varying the focal length,
   said objective forming a real intermediate image,
   the position of the latter being variable in dependence on a variation of the focal length of said objective,
   at least one inverting system arranged on said optical axis in series with said objective forming a real image of said intermediate image,
   at least one member of said inverting system being arranged for continuous movement along said optical axis for continuously varying the magnification factor of said inverting system, the movable member of said inverting system being displaced along the optical axis simultaneously with said movable member of said objective in such manner, that the plane of the image formed by said inverting system is invariable, when varying the focal length of the total system, an aperture diaphragm provided between said movable member of said inverting system and the locus of the image formed by said inverting system, an image of said aperture diaphragm being formed within said objective, and said inverting system forming the image of said diaphragm on the optical axis so that said movable member will move through said image of said diaphragm.

2. In an optical system for photographic or cinematographic apparatus, an objective of variable focal length comprising at least two members defining an optical axis, at least one objective member being arranged for movement along said optical axis for varying the focal length, said objective forming a real intermediate image, at least one inverting system arranged in series with said objective forming a real image of said intermediate image, an aperture diaphragm provided between the locus of said intermediate image and the locus of the image formed by said inverting system, an image of said aperture diaphragm being formed at least in one setting of the focal length in front of a rear surface of said movable objective member, said optical system being made substantially according to the following data, wherein $L_I$ to $L_{III}$ indiciate the members of said objective and $L_R$ the inverting system and the focal length, the back focus and the spacings $d_{22}$, $d_{23}$ and $d_{24}$ for five settings being given in terms of millimeters:

| Member of the optical system | Focal length in mm. | | Spacings (five settings) | | | | |
|---|---|---|---|---|---|---|---|
| | | | 1 | 2 | 3 | 4 | 5 |
| $L_I$ | +87.5 | | | | | | |
| $L_{II}$ | −13.0 | $d_{22}$ | 7.50 | 16.94 | 26.38 | 35.82 | 45.25 |
| $L_{III}$ | +14.4 | $d_{23}$ | 58.68 | 48.57 | 38.11 | 26.89 | 10.00 |
| $L_R$ | +20.0 | $d_{24}$ | 57.85 | 58.52 | 59.53 | 61.32 | 68.78 |
| Back focus | | | 40.00 | 40.00 | 40.00 | 40.00 | 40.00 |
| Total focal length | | | 4.08 | 5.67 | 8.45 | 14.16 | 38.89 |

Relative aperture = 1:1.8.

3. In an optical system for photographic or cinematographic apparatus, an objective forming a real intermediate image, an optical axis defined by said objective, at least one inverting system arranged in series with said objective on said optical axis forming a real image of said intermediate image, said inverting system being arranged for movement along said optical axis in two different positions, having in a first position on said optical axis a magnification factor $\beta$ different from unity and in a conjugated position on said optical axis a magnification factor $1/\beta$, an aperture diaphragm provided between said movable inverting system and the locus of the image formed by the inverting system, an image of said aperture diaphragm being formed with said objective, said optical system being made substantially according to the following data, wherein $L_I$ to $L_{III}$ indicate the members of said objective and $L_R$ the inverting system and $L_F$ the field lens, and the focal length, the back focus and the spacings $d_{27}$, $d_{28}$, $d_{29}$ and $d_{32}$ for five settings of said objective and two settings (A and B) of said inverting system being given in terms of millimeters:

A. MAGNIFICATION OF THE INVERTING SYSTEM
$\beta = 0.816$

| Member of the optical system | Focal length in mm. | | Spacings (five settings) | | | | |
|---|---|---|---|---|---|---|---|
| | | | 1 | 2 | 3 | 4 | 5 |
| $L_I$ | +80.00 | | | | | | |
| $L_{II}$ | −13.00 | $d_{27}$ | 10.00 | 18.94 | 27.87 | 36.81 | 45.74 |
| $L_{III}$ | +15.48 | $d_{28}$ | 57.06 | 47.33 | 37.22 | 26.26 | 10.00 |
| $L_F$ | −16.10 | $d_{29}$ | 19.64 | 20.43 | 21.61 | 23.63 | 30.95 |
| $L_R$ | +20.00 | $d_{32}$ | 44.49 | 44.49 | 44.49 | 44.49 | 44.49 |
| Back focus | | | 36.33 | 36.33 | 36.33 | 36.33 | 36.33 |
| Total focal length | | | 4.00 | 5.56 | 8.60 | 14.81 | 39.94 |

Relative aperture 1:1.8.

B. MAGNIFICATION OF THE INVERTING SYSTEM
$\beta = 1.224$

| Member of the optical system | Focal length in mm. | | Spacings (five settings) | | | | |
|---|---|---|---|---|---|---|---|
| | | | 1 | 2 | 3 | 4 | 5 |
| $L_I$ | +80.00 | | | | | | |
| $L_{II}$ | −13.00 | $d_{27}$ | 10.00 | 18.94 | 27.87 | 36.81 | 45.74 |
| $L_{III}$ | +15.49 | $d_{28}$ | 57.06 | 47.33 | 37.22 | 26.26 | 10.00 |
| $L_F$ | −16.10 | $d_{29}$ | 19.64 | 20.43 | 21.61 | 23.63 | 30.95 |
| $L_R$ | +20.00 | $d_{32}$ | 36.33 | 36.33 | 36.33 | 36.33 | 36.33 |
| Back focus | | | 44.49 | 44.49 | 44.49 | 44.49 | 44.49 |
| Total focal length | | | 6.01 | 8.48 | 12.90 | 22.22 | 59.92 |

Relative aperture equals 1:1.8.

4. An optical system, as set forth in claim 1, made substantially according to the following data, wherein $L_I$ to $L_{III}$ indicate the members of the objective and $L_R$ the inverting system and $L_F$ the field lens, and the focal length, the back focus and the spacings $d_{33}$, $d_{34}$, $d_{35}$, and $d_{36}$ for the five settings are given in terms of millimeters:

| Member of the optical system | Focal length in mm. | | Spacings (five settings) | | | | |
|---|---|---|---|---|---|---|---|
| | | | 1 | 2 | 3 | 4 | 5 |
| $L_I$ | +58.50 | | | | | | |
| $L_{II}$ | −14.00 | $d_{33}$ | 6.67 | 15.00 | 22.00 | 30.50 | 34.13 |
| $L_{III}$ | +13.91 | $d_{34}$ | 37.47 | 29.13 | 22.13 | 13.63 | 10.00 |
| $L_F$ | −33.33 | $d_{35}$ | 20.90 | 20.90 | 20.90 | 29.90 | 20.90 |
| $L_R$ | +10.00 | $d_{36}$ | 23.77 | 23.21 | 22.23 | 20.00 | 18.10 |
| Back focus | | | 16.23 | 16.79 | 17.67 | 20.00 | 21.90 |
| Total focal length | | | 4.09 | 6.98 | 12.29 | 29.37 | 44.70 |

Relative aperture = 1:1.8.

5. The optical system, as set forth in claim 1, made substantially according to the following data, wherein:

$L_I$ to $L_{III}$ indicate the members of the objective and $L_R$ the inverting system and the focal length, the back focus and the spacings $d_{39}$, $d_{40}$ and $d_{41}$ for five settings are given in terms of millimeters:

| Member of the optical system | Focal length in mm. | Spacings (five settings) | | | | |
|---|---|---|---|---|---|---|
| | | | 1 | 2 | 3 | 4 | 5 |
| $L_I$ | +62.00 | $d_{39}$ | 10.00 | 15.85 | 21.70 | 27.55 | 33.40 |
| $L_{II}$ | −13.00 | $d_{40}$ | 33.40 | 27.55 | 21.70 | 15.85 | 10.00 |
| $L_{III}$ | +14.76 | $d_{41}$ | 51.31 | 50.97 | 50.42 | 49.39 | 46.19 |
| $L_R$ | +10.00 | | | | | | |
| Back focus | | | 14.88 | 15.22 | 15.77 | 16.80 | 20.00 |
| Total focal length | | | 4.14 | 6.07 | 9.74 | 17.17 | 40.00 |

Relative aperture =1:1.8.

6. The optical system, as set forth in claim 1, made substantially according to the following data, wherein $L_I$ to $L_{III}$ indicate the members of said objective and $L_R$ the inverting system and the focal length, the back focus and the spacings $d_{43}$, $d_{44}$ and $d_{45}$ for five settings are given in terms of millimeters:

| Member of the optical system | Focal length in mm. | Spacings (five settings) | | | | |
|---|---|---|---|---|---|---|
| | | | 1 | 2 | 3 | 4 | 5 |
| $L_I$ | +75.00 | $d_{43}$ | 10.00 | 17.50 | 25.00 | 32.50 | 40.00 |
| $L_{II}$ | −15.00 | $d_{44}$ | 40.00 | 32.50 | 25.00 | 17.50 | 10.00 |
| $L_{III}$ | +17.06 | $d_{45}$ | 70.34 | 69.96 | 69.33 | 68.16 | 65.41 |
| $L_R$ | +14.75 | | | | | | |
| Back focus | | | 21.62 | 22.00 | 22.63 | 23.80 | 26.55 |
| Total focal length | | | 4.21 | 6.21 | 9.97 | 18.13 | 40.00 |

Relative aperture=1:1.8.

7. The optical system, as set forth in claim 1, made substantially according to the following data, wherein $L_I$ to $L_{III}$ indicate the members of said objective and $L_R$ the inverting system and the focal length, the back focus and the spacings $d_{47}$, $d_{48}$ and $d_{49}$ for five settings are given in terms of millimeters:

| Member of the optical system | Focal length in mm. | Spacings (five settings) | | | | |
|---|---|---|---|---|---|---|
| | | | 1 | 2 | 3 | 4 | 5 |
| $L_I$ | +64.16 | $d_{47}$ | 10.00 | 17.00 | 24.00 | 31.00 | 37.78 |
| $L_{II}$ | −12.50 | $d_{48}$ | 37.78 | 30.78 | 23.78 | 16.78 | 10.00 |
| $L_{III}$ | +17.20 | $d_{49}$ | 71.38 | 70.94 | 70.16 | 68.56 | 63.49 |
| $L_R$ | +14.21 | | | | | | |
| Back focus | | | 20.54 | 20.98 | 21.75 | 23.36 | 28.43 |
| Total focal length | | | +4.00 | +6.19 | +10.69 | +21.86 | +60.00 |

Relative aperture=1:1.8.

8. The optical system, as set forth in claim 1 wherein the magnification factor of said movable member of said objective and the magnification factor of the inverting system change from values smaller than unity to values higher than unity and in an intermediate position simultaneously reach the value $\beta=1$.

References Cited

UNITED STATES PATENTS

| | | | |
|---|---|---|---|
| 1,091,933 | 3/1914 | Humbrecht | 350—42 |
| 3,038,378 | 6/1962 | Harris et al. | 350—186 X |
| 3,293,457 | 12/1966 | Doi et al. | |
| 2,804,802 | 9/1957 | Loeck | 350—42 X |
| 3,045,545 | 7/1962 | Korones et al. | 350—42 X |

FOREIGN PATENTS 536,706  5/1941  Great Britain.

JOHN K. CORBIN, *Primary Examiner.*

U.S. Cl. X.R.

350—184, 207